(12) United States Patent
Rickert et al.

(10) Patent No.: US 7,478,520 B2
(45) Date of Patent: Jan. 20, 2009

(54) MACHINE FOR HARVESTING STALK-LIKE PLANTS WITH A STRIPPER

(75) Inventors: Clemens Rickert, Ahaus (DE); Martin Hüning, Billerbeck (DE); Leo Schulze Hockenbeck, Everswinkel (DE); Klemens Weitenberg, Borken (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 11/755,068

(22) Filed: May 30, 2007

(65) Prior Publication Data
US 2007/0294995 A1 Dec. 27, 2007

(30) Foreign Application Priority Data
Jun. 3, 2006 (DE) .................... 10 2006 026 070

(51) Int. Cl.
*A01D 43/02* (2006.01)
(52) U.S. Cl. .................................................. 56/51
(58) Field of Classification Search ............... 56/51, 56/62, 60, 119, 92
See application file for complete search history.

(56) References Cited

U.S. PATENT DOCUMENTS

| | | | | |
|---|---|---|---|---|
| 5,722,225 A | * | 3/1998 | Wuebbels et al. | 56/60 |
| 5,852,922 A | * | 12/1998 | Over Behrens et al. | 56/14.7 |
| 6,775,967 B2 | * | 8/2004 | Wubbels | 56/60 |
| 6,826,897 B2 | * | 12/2004 | Wubbels | 56/51 |
| 7,010,903 B2 | * | 3/2006 | Bruening | 56/51 |
| 7,028,458 B2 | * | 4/2006 | Bruening et al. | 56/51 |
| 2004/0123576 A1 | | 7/2004 | Bruening | |

FOREIGN PATENT DOCUMENTS

| | | |
|---|---|---|
| DE | 195 31 918 | 3/1997 |
| DE | 199 52 566 | 6/2001 |
| DE | 102 58 013 | 6/2004 |
| EP | 0 069 898 | 1/1983 |
| EP | 0 508 189 | 10/1992 |
| EP | 0 760 200 | 6/1996 |
| GB | 2 012 154 | 7/1979 |

OTHER PUBLICATIONS

European Search Report, Oct. 4, 2007, 5 pages.

* cited by examiner

*Primary Examiner*—Árpád Fábián-Kovács

(57) ABSTRACT

A machine for the harvest of stalk-like plants is provided. The machine has a frame, two conveying elements supported on the frame and arranged one above the other with recesses distributed around their circumference for taking up and conveying a flow of crop that includes plant stalks. A stripper extends into the intervening space between the conveying elements in order to move the plant stalks out of the recesses. The stripper is connected to the frame by a free-standing post that extends vertically and is arranged outside the flow of the crop conveyed by the conveying elements. A point of the stripper interacts with the conveying elements located to the rear of the axis of rotation of the conveying elements relative to the forward operating direction of the machine.

8 Claims, 3 Drawing Sheets

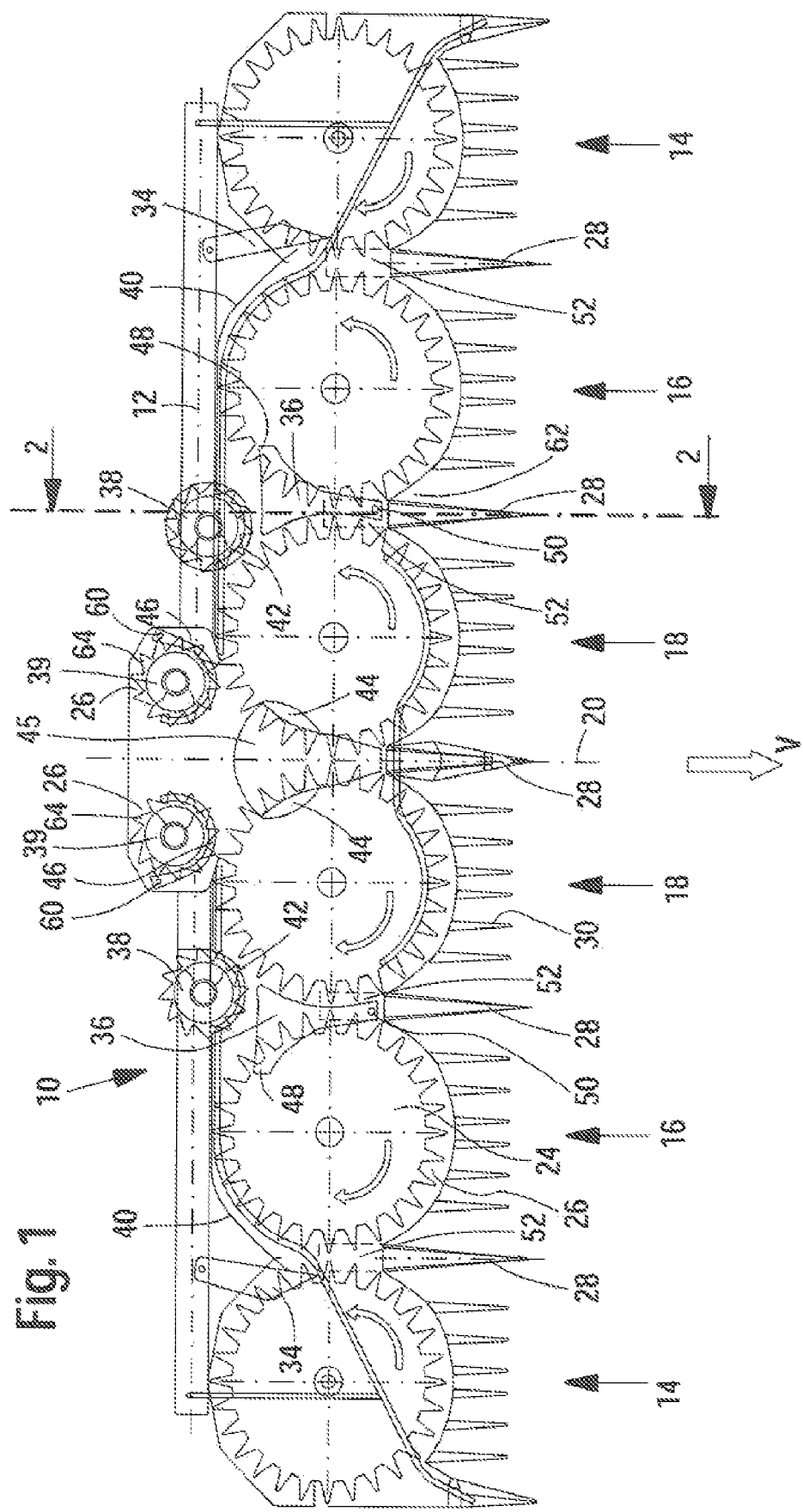

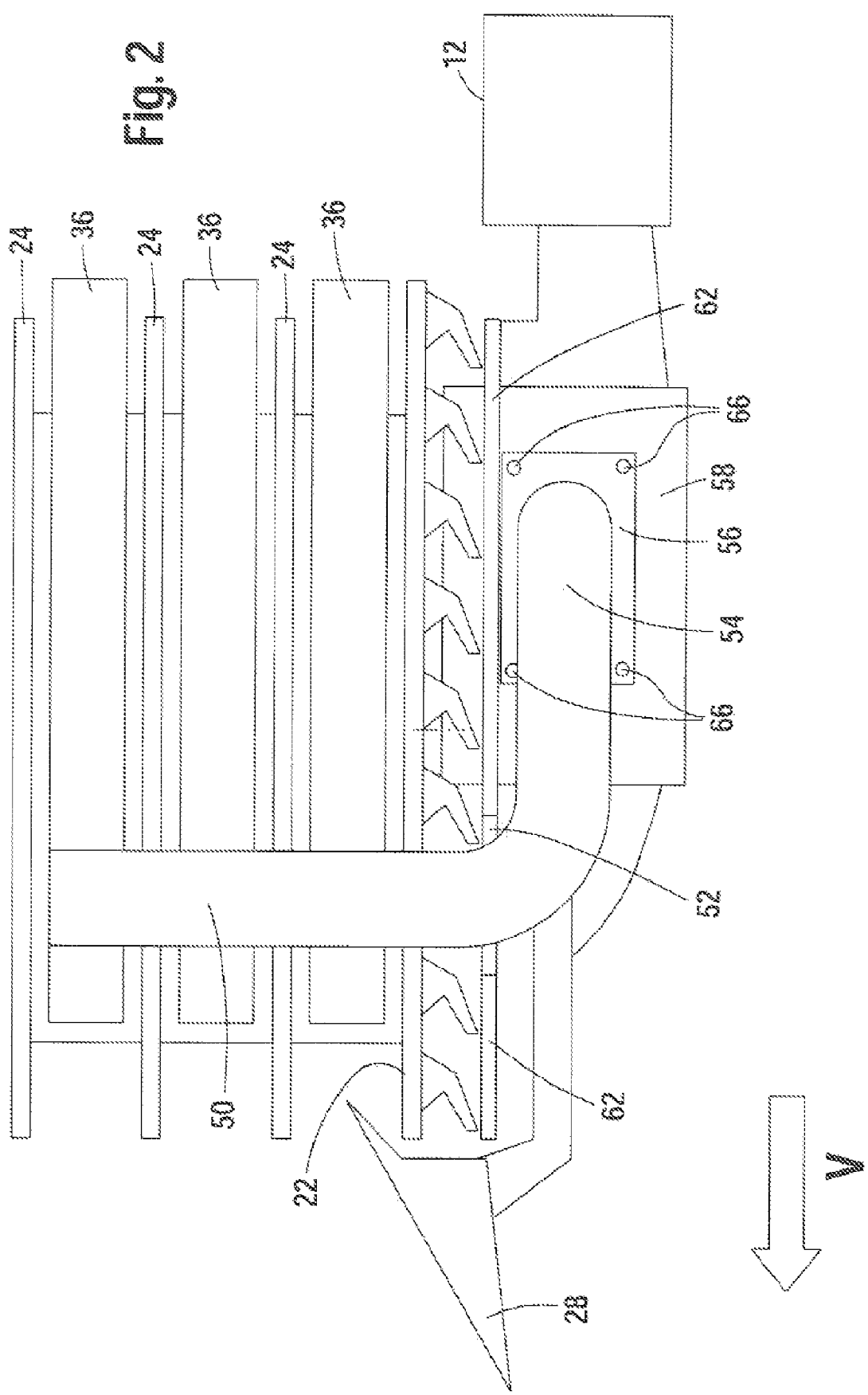

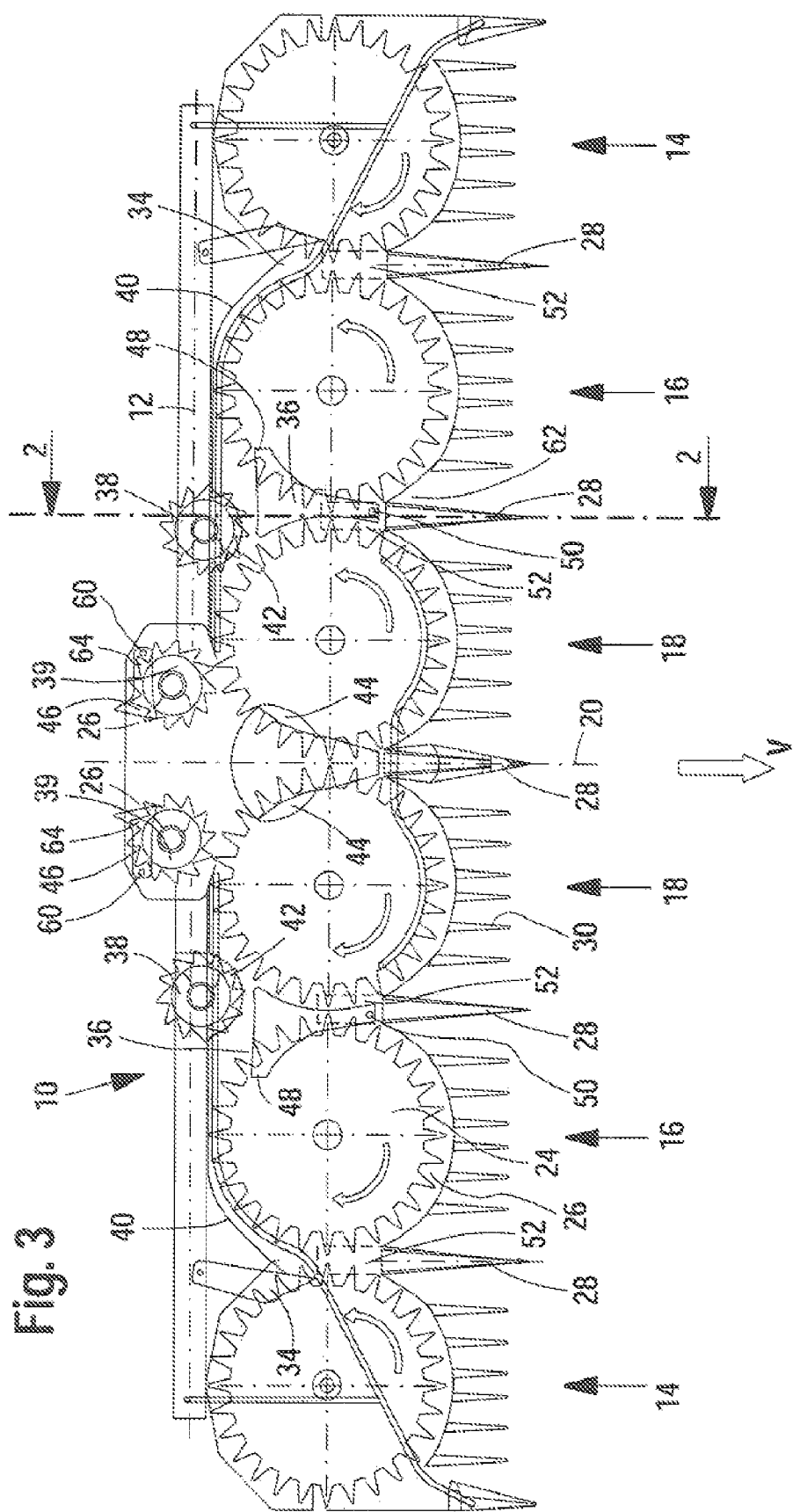

MACHINE FOR HARVESTING STALK-LIKE PLANTS WITH A STRIPPER

FIELD OF THE INVENTION

The invention concerns a machine for harvesting stalk-like plants.

BACKGROUND OF THE INVENTION

Machines appropriate for the harvesting of stalk-like plants, such as corn, and for attachment to a forage harvester are described in publications DE 195 31 918 A and DE 102 58 013 A, such machines are provided with several mowing and intake arrangements arranged transverse to the forward operating direction in which the machine is moved over a field during the harvesting operation. The mowing and intake arrangements include a lower cutter disk in the form of a circular saw blade and conveying disks arranged above these that are provided with recesses which accept plants. The cutting disks are brought into rotation at higher speeds than the conveying disks. Once they have been separated from the stubble remaining in the ground by means of the cutting disks, the plants are accepted by the conveying disks and transported to the center of the machine by the conveying disks into the transverse conveying disks arranged in the gore regions between the conveying disks on the rear sides of the mowing and intake arrangements and delivered to an intake channel of a forage harvester by slope conveyor drums.

In order to lift the plants out of the conveying disks for further delivery to the following transverse conveying drums or conveying disks, so-called strippers are provided, whose points extend into the intervening space between two conveying disks arranged one above the other. The strippers are connected to the bottom of the machine by vertical posts at a short distance downstream of the point. Such strippers are also called cleaning devices or take-out devices. Further strippers are also associated with the transverse conveying drums and the slope conveying drums. They are connected to the bottom of the machine by posts at the output ends of the transverse conveying drums and the slope conveying drums.

EP 0 069 898 A describes a machine of the type cited initially that includes two mowing and intake arrangements with lower cutting disks and conveying disks arranged above these that contain recesses distributed around their circumferences that accept plants. S-shaped strippers are arranged to the rear of the mowing and intake arrangements, the points of the strippers located upstream extend into the intervening vertical space between two conveying disks. The harvested crop is conveyed along the rear sides of the strippers. Posts extending vertically downward are fastened to the rear sides of the mowing and intake arrangements, the posts, in turn, are fastened with their lower ends to gearbox housings of the mowing and intake arrangements. Here the post is separated from the flow of the crop only by the strippers, so that, here too, plants can be wrapped around the posts.

DE 199 52 566 C describes another machine for the harvesting of stalk-like plants with chains arranged one above the other to which drivers are attached that project outward for the conveying of plants. The chains circulate about deflecting sprockets that rotate about vertical axes. Cutting elements are attached below the chains to cut the plants from the stubble remaining in the ground. Sheet metal components used as strippers are arranged at the outlet end between chains following each other, one above the other, which are connected to the bottom of the machine by posts arranged to the rear of the deflecting sprockets. Here the posts are also located in the flow of the crop, so that plants may become entangled with them.

EP 0 508 189 A proposes another machine for the harvest of stalk-like plants that also includes rotating mowing and intake arrangements with lower cutting disks and upper conveying disks. Each of the mowing and intake arrangements adjoining the longitudinal center plane of the machine is associated with a single stripper that is attached to an upper horizontal cover that is stationary and is fastened to the center of the machine. A stationary cover is required for the attachment of the stripper that can be arranged in the center of the machine only if the outer mowing and intake arrangements are also to convey the harvested crop to the rear of the machine.

Finally, GB 20 12 154 A describes a machine for the harvest of stalk-like plants that also includes rotating mowing and intake arrangements with lower cutting disks and upper conveying disks. Strippers are connected with the bottom of the machine ahead of the axis of rotation of the mowing and intake arrangements and to the side walls of a stalk divider and at the outlet end to the rear side of the mowing and intake arrangements.

SUMMARY OF THE INVENTION

In accordance with a first aspect of the invention, a machine includes a frame and two or more conveying elements (rotating about an axis or as endless conveyors conducted about deflecting sprockets or pulleys) with recesses distributed about their circumferences that accept and convey plant stalks. A lower cutting disk may be arranged underneath the conveying elements, so that a mowing and intake arrangement is formed together with the conveying elements. A stripper engages the intervening vertical space between conveying elements arranged immediately one above the other, it is connected directly or indirectly with the frame by a free-standing post that extends vertically. The post is arranged outside the flow of the crop. The point of the stripper that lifts the harvested crop out of the recesses of the conveying elements is located to the rear of the axis of rotation of the conveying elements relative to the forward operating direction of the machine, while the post is arranged ahead of the axis of rotation.

In this way, the post is arranged relatively far from the flow of the crop, so that no plant parts or only relatively few plant parts can become entangled with the post, particularly stalks of cereal crops during the whole plant silage, or that plants that nevertheless accumulate at the post cannot as a minimum impair the operation of the stripper. The stripper can be located at any desired position of the machine since it is connected in any desired way to the post that is connected to the frame of the machine.

The post may be arranged in the vicinity of the forward edge of the machine.

The stripper may be provided with a surface that faces the circumference of the conveying elements of a second mowing and intake arrangement adjoining the mowing and intake arrangement, located closer to the longitudinal center plane of the machine. If this surface surrounds the conveying elements of the second mowing and intake arrangement in a circular arc, it can interact with these conveying elements in order to establish a guidance for the plants taken up by the second mowing and intake arrangement that is arranged on the mowing and intake arrangement. Thereby the covers arranged above the first mowing and intake arrangement, which performed this task previously, can be omitted, or they can support this task.

In addition the stripper can be provided with a rear surface that faces a transverse conveying drum, where the rear surface and the transverse conveying drum interact in order to guide and convey the flow of the harvested crop from the mowing and intake arrangement to the second mowing and intake arrangement, located downstream.

BRIEF DESCRIPTION OF THE DRAWINGS

The drawings show two embodiments of the invention that are described in greater detail below.

FIG. 1 shows a plan view of a first embodiment of a machine for the harvesting of stalk-like plants.

FIG. 2 shows a cross section through the machine along the line 2-2.

FIG. 3 shows a plan view of a second embodiment of a machine for the harvesting of stalk-like plants.

DESCRIPTION OF THE PREFERRED EMBODIMENT

Three mowing and intake arrangements 14, 16, 18 are fastened side by side to a frame 12 on each side of a longitudinal center plane 20 of a machine 10 for the harvest of stalk-like plants and are shown in a plan view in FIG. 1. Each of the mowing and intake arrangements 14 through 18 is composed of a lower cutting disk 22 (see FIG. 2), and can be brought into rotation and several conveying elements 24 arranged coaxially above these that can be brought into rotation. The cutting disks 22 are equipped with sharp teeth at their edges or sharpened in other ways, in order to separate the stalks of the plants from the stubble remaining in the ground. The plant stalks are accommodated in projections 26 of the conveying elements 24 and are transported by a forage harvester (not shown) as described below that carries the machine 10 and drives its movable elements and moves the machine 10 in the forward operating direction V over a field. In the following the directions cited, such as forward or backward, refer to the forward operating direction V.

Stalk dividers 28 are located between each of the mowing and intake arrangements 14 through 18 in order to deflect the plants to the side and to bring them into the intake region of the mowing and intake arrangements 14 through 18, if necessary. Smaller stalk dividers 30 are attached to the front sides of the mowing and intake arrangements 14 through 18. In each case the operating width of the mowing and intake arrangements 14 through 18 corresponds to one row, that is, approximately 0.75 meters. Therefore the machine 10 can simultaneously harvest six rows of corn sown with a spacing of 75 cm. But the operating width of the mowing and intake arrangements 14 through 18 could also be smaller or larger (for example, 1.5 meters).

During the harvesting operation the mowing and intake arrangements 14 through 18 rotate in the directions indicated by the arrows. Therefore the inner mowing and intake arrangements 18 located adjacent to the longitudinal center plane 20 convey the plants at first to the outside and then to the rear, as do the mowing and intake arrangements 16 that follow to the outside, while the outer mowing and intake arrangements 14 rotate in the opposite direction. As can be seen on the basis of FIG. 1, the outer mowing and intake arrangements 14 deliver their portion of the harvested crop approximately in the center between the axes of rotation of the mowing and intake arrangements 14, 16 to the center inner mowing and intake arrangements 18. For this purpose strippers 34 are provided which extend through slots in the rear guide walls 40 of the machine 10 which also enclose the center and inner mowing and intake arrangements 16, 18 from the rear. The strippers 34 are connected with the bottom plate 62 or a rear wall of the machine 10 on the rear side of the guide walls 40. The strippers 34 include points that intrude into the intervening space between the conveying elements 24 of the outer mowing and intake arrangement 14.

The harvested crop is lifted out of the recess 26 by further strippers 36 on the rear side of the center mowing and intake arrangement 16 and delivered to the inner mowing and intake arrangements 18 by transverse conveying drums 38 which include teeth 42 that extend through slots in the rear wall 40. The strippers 36 extend from their original operating region with their points 48 arranged on the rear side of the machine 10, where they lift the plants out of the conveying elements 24 of the center mowing and intake arrangement 18 and they extend to a post 50 in the vicinity of the front edge of the machine 10 that is located in the vicinity of the attachment point of a stalk divider 28.

In the plan view (FIG. 1) the strippers 36 are approximately triangular and have a side surface that follows the circumference of the conveying elements 24 of the center mowing and intake arrangement 16 and a rear surface extending transverse to the direction of operation that is used to define a forward border of the path of conveying of the plants from the center mowing and intake arrangement 16 to the transverse conveying drum 38 and up to the next inner mowing and intake arrangement 18. This rear surface and the transverse conveying drum 38 interact in order to guide and convey the flow of harvested crop from the center mowing and intake arrangement 16 up to the next inner mowing and intake arrangement 18. The third side of the strippers 36 facing the inner mowing and intake arrangement 18 follows the circumference of the conveying elements 24 of the inner mowing and intake arrangement 18 and interacts with these in order to establish a guidance for the plants taken up by the inner mowing and intake arrangement 18.

At their forward ends the strippers 36 are connected to the bottom plate 62 of the machine 10 by vertical posts 50. Except for the connection at the post 50 the individual sheet metal components of the strippers 36 are not connected to each other in the vertical direction, so that any possible accumulation of harvested crop can be carried away by successive harvested crop. The strippers 36 may be flat sheet metal components in themselves or they may be provided with a U-shaped cross section as is shown by DE 102 58 013 A.

On the rear side of the inner mowing and intake arrangements 18 the harvested crop is lifted out of the projections 26 by further strippers 44 and delivered to conveyor drums 39, the strippers are fastened to a center cover 45, the conveyor drums include conveying elements 64 that rotate about axes inclined slightly toward the front, the conveying elements 64 are provided with recesses 26, in order to overcome the difference in height between the bottom of the machine 10 and the following intake rolls of the intake channel of the forage harvester. In place of the strippers 44, strippers 36 of the center mowing and intake arrangements 16 could also be used.

The conveying drums 39 are also associated with arc-shaped strippers 46 that are fastened to the frame 12 by vertical posts 60 ahead of (and upstream of) the conveying drums 39 and to the rear of the flow of the crop (even to the rear of the axes of rotation of the conveying drums 39), the posts 60 are configured analogously to the posts 50. Such strippers 46 could also be associated with the transverse conveying drums 38.

FIG. 2 shows a cross section through the machine 10 along the line 2-2 of FIG. 1. The post 50 extends in the vertical direction through an approximately rectangular opening 52 in a bottom plate 62 that is connected to the frame 12, at its lower end. The post is provided with a section 54 that extends horizontally to the rear opposite to the forward direction of operation V, a flange 56 is welded to the rear end of the section. The flange 56 is fastened to a gearbox housing 58 by two U-shaped brackets that extend through the bores 66 in the flange 56, or it is connected directly by screws that extend through threaded holes in the gearbox housing 58. The gearbox housing 58 contains components of the drive-line of the conveying elements 24 and the cutting disks 22 of the inner mowing and intake arrangement 18, in turn, is bolted to the frame 12. Alternatively or in addition, the post 50 could be fastened to the gearbox housing of the center mowing and intake arrangement 16. The strippers 36 are welded to the post 50 or fastened to it in any other desirable manner, for example, bolted to it or applied to a non-circular profile.

Openings 52 are also arranged ahead of the strippers 34 of the outer mowing and intake arrangement 14. They make it possible for plant parts that accumulate in the area of the strippers 34 and 36 to fall downward onto the field, so that larger accumulations of plant parts and jams resulting therefrom are avoided.

Since the fastening elements of the strippers, that is, the posts 50, are arranged relatively far from the points 48 of the strippers 36 that interact with the plants, there is no longer an expectation that plant parts become entangled with the posts 50 or 60 or that at least so many plants do not accumulate as to impair the operation of the strippers 36. Accordingly the operation of the machine 10 according to the invention is improved.

In a machine 10 with a larger number of mowing and intake arrangements 14 through 18 further mowing and intake arrangements (not shown) can be inserted between the outer mowing and intake arrangements 14 and the center mowing and intake arrangements 16, whose direction of rotation corresponds to the center mowing and intake arrangement 16 (as described in DE 195 31 918 A) and whose strippers are the same as the strippers 36.

In the second embodiment of a machine 10 shown in FIG. 3, elements coinciding with those of the first embodiment are identified with the same part number call-outs. The difference, however, is the attachment of the strippers 46 of the conveying drums 39 that are located here completely behind the conveying drums 39 and are fastened to the frame 12 by posts 60 at the outer and rear sides of the conveying drums 39. The strippers 46 according to FIG. 3 could also be associated with the transverse conveying drums 38.

Having described the preferred embodiment, it will become apparent that various modifications can be made without departing from the scope of the invention as defined in the accompanying claims.

The invention claimed is:

1. A machine for the harvest of stalk-like plants, the machine having a frame, two conveying elements supported on the frame and arranged one above the other with recesses distributed around their circumference for the acceptance and conveying of a flow of crop that includes plant stalks, and a stripper that extends into the intervening space between the conveying elements, in order to move the plant stalks out of the recesses, the stripper being connected with the frame by a free-standing vertical post arranged outside of the flow of the crop conveyed by the conveying elements and a point of the stripper that interacts with the conveying element is located to the rear of an axis of rotation of the conveying elements relative to the forward operating direction of the machine, wherein the post is arranged ahead of the axis of rotation of the conveying elements relative to the forward operating direction of the machine.

2. A machine according to claim 1, wherein the post is arranged downstream of the stripper relative to the direction of rotation of the conveying elements.

3. A machine according to claim 1 wherein the conveying elements form a mowing and intake arrangement together with a cutting disk arranged underneath the conveying elements.

4. A machine according to claim 3 wherein the stripper is provided with a side surface that follows the circumference of the conveying elements of the mowing and intake arrangement adjacent to another mowing and intake arrangement located closer to the longitudinal center plane of the machine, and interacts with the conveying elements in order to establish a guidance for the plants taken up by the other mowing and intake arrangement.

5. A machine according to claim 3, wherein the stripper is provided with a rear surface that faces a transverse conveying drum and the rear surface and the transverse conveying drum interact in order to guide and convey the flow of the crop between them from the mowing and intake arrangement to a mowing and intake arrangement located downstream.

6. A machine according to claim 1, wherein several strippers are arranged one above the other and are connected to each other only by the post.

7. A machine according to claim 1, wherein the post extends through an opening in a bottom plate and is connected with the frame underneath the bottom plate.

8. A machine according to claim 7, wherein the post is connected with the frame by the gearbox housing of a mowing and intake arrangement.

* * * * *